United States Patent
Noack

[11] Patent Number: 5,386,525
[45] Date of Patent: Jan. 31, 1995

[54] SYSTEM FOR PROVIDING APPLICATION PROGRAMS WITH DIRECT ADDRESSABILITY INTO A SHARED DATASPACE

[75] Inventor: Otto F. Noack, Walnut Creek, Calif.

[73] Assignee: Pacific Bell, San Francisco, Calif.

[21] Appl. No.: 784,265

[22] Filed: Oct. 29, 1991

[51] Int. Cl.$^6$ .............................................. G06F 12/06
[52] U.S. Cl. ................................... 395/400; 395/425; 395/600; 395/650; 364/DIG. 1; 364/231.6; 364/281.4; 364/281.8
[58] Field of Search ............... 395/400, 700, 500, 600, 395/650, 425; 364/231.6, 281.4, 281.8

[56] References Cited

U.S. PATENT DOCUMENTS

| | | | |
|---|---|---|---|
| 3,886,525 | 5/1975 | Brown et al. | |
| 4,408,273 | 10/1983 | Plow | 395/600 |
| 4,453,212 | 6/1984 | Gaither et al. | |
| 4,665,484 | 5/1987 | Nanba | |
| 4,823,261 | 4/1989 | Bank | |
| 4,855,905 | 8/1989 | Estrada et al. | 395/500 |
| 4,888,681 | 12/1989 | Barnes et al. | 395/600 |
| 4,975,833 | 12/1990 | Jinzaki | |
| 5,049,873 | 9/1991 | Robbins et al. | 340/825.06 |
| 5,060,186 | 10/1991 | Barbagelata et al. | 364/200 |
| 5,095,420 | 5/1992 | Eilert et al. | 395/600 |
| 5,113,522 | 5/1992 | Dinwiddie, Jr. et al. | 395/700 |
| 5,123,098 | 6/1992 | Gunning et al. | 395/400 |
| 5,134,696 | 7/1992 | Brown et al. | 395/425 |
| 5,210,854 | 5/1993 | Beaverton et al. | 395/500 |
| 5,230,069 | 7/1993 | Brelsford et al. | 395/400 |

OTHER PUBLICATIONS

Application Development Reference:/Services for Authorized/Assembler Language Programs/ALESERV through DYNALLOC/Vol. 1 of 4"MVS/ESA System Product:/JES2 Version 4/JES3 Version 4", International Business Machines 1988, 1991, pp. 15–22, 209–218.

International Business Machines, Corp., "MVS/ESA System Programming Library: System Modifications," MVS/System Product, JES2 Version 3, JES3 Version 3, GC28-1831-1, Second Edition (Nov., 1988) Chapter 11, pp. 11-1 to 11-3.

Int'l Business Machines Corp. "MVS/ESA Callable Services for High Level Languages, COBOL, FORTRAN, PASCAL, PL/I," MVS/System Product: JES2 Version 3, JES3 Version 3, GC28-1843-0, First Edition (Nov. 1988) Chapt. 1 pp. 1–8.

International Business Machines Corp., "MVS/ESA SPL: Application Development-Extended Addressability," MVS/System Product: JES2 Version 3, JES3 Version 3, GC28-1854-1, Second Edition, (Nov. 1988), Chapt. 1, pp. 1–10.

*Primary Examiner*—Thomas G. Black
*Assistant Examiner*—Wayne Amsbury
*Attorney, Agent, or Firm*—Merchant, Gould, Smith, Edell, Welter & Schmidt

[57] ABSTRACT

A method of sharing dataspaces among a plurality of applications on IBM mainframe computers. A DataServ Routing Table (DSRT) is anchored in an extended command storage area (ECSA) by a pointer stored in a SubSystem Communications vector Table (SSCVT) which also resides in the ECSA. The DSRT identifies all DataServ tasks using pointers to DataServ Vector Tables (DSVT), which are created by each DataServ task in the ECSA. Each DSVT contains a pointer to a DataServ task, as well as a pointers to associated Dataspace Information Element (DSIE) and DataServ Application Descriptor (DSAD) pools. The DSIEs contain a description of each dataspace created by the DataServ task. The DSADs contain a description of each application currently accessing a dataspace created by the DataServ task. Each DataServ task is responsible for creating one or more dataspace, mapping a linear dataset to the dataspace, and then making the dataspace available to authorized applications by creating its associated DSVT, DSIEs, and DSADs. An application communicates with the DataServ task through a DataServ Application Interface (DSAPPL), which is a set of service routines for accessing the DSRT, DSVT, DSIEs, and DSADs to provide direct addressability to the dataspaces.

18 Claims, 12 Drawing Sheets

PARAMETER LIST

152

| | |
|---|---|
| BLOCK | 154 |
| KEY | 156 |
| BUFFER | 158 |
| WORK AREA | 160 |
| CALL CODE | 162 |
| DSAX NAME | 164 |
| SYSTEM NAME | 166 |
| DATASPACE LIST | 168 |
| DATASPACE NAME | 170 |
| APPLICATION ID | 172 |
| USER PARAMETER LIST | 174 |

SYSTEM FOR PROVIDING APPLICATION PROGRAMS WITH DIRECT ADDRESSABILITY INTO A SHARED DATASPACE

BACKGROUND OF THE INVENTION

1. Field of the Invention

This invention relates in general to a method for programming IBM mainframe computers and, more specifically, to an access method for shared dataspaces under the MVS/ESA operating system.

2. Description of Related Art

Under the MVS/ESA operating system provided by IBM for use on its large-scale commercial mainframe computers, an address space for an application is limited to a size of 2 gigabytes, due to the 31 bit effective length of an address field. This amount of address space, however, may too small to meet the needs of applications that must have rapid access to large amounts of data.

To overcome this limitation, the MVS/ESA operating system makes available a feature known as a "dataspace," which represents an advance in data-in-memory technology. Dataspaces extend the reach of applications by providing additional data-only address spaces. Unlike an address space, a dataspace contains only user data; it does not contain system control blocks, common areas, or program code. The size of a dataspace can range up to 2 gigabytes, according to the request made by the application, thereby providing an application with access to multiple 2-gigabyte storage areas, i.e., its own address space and one or more dataspaces.

The MVS/ESA operating system also provides a data-in-virtual (DIV) feature for loading data into dataspaces. If the data to be loaded into the dataspaces is from a Virtual Storage Access Method (VSAM) linear dataset, then the DIV feature can map the data and move it directly from direct storage access devices (DASD) into the dataspace. The DIV feature also can move the data from the dataspace back to DASD. Using the DIV feature, the application does not have to use its address space as an intermediate buffer area for transferring data between DASD and the dataspace.

Despite these features, the MVS/ESA operating system does not provide an easily usable interface to make dataspaces readily sharable among a plurality of applications. The token offering provided with MVS/ESA, known as Data Windowing Services, does not adequately exploit dataspaces, and presents a difficult, unfamiliar programming interface to the programmer. The potential advantages of dataspaces remain untapped because of these shortcomings.

For example, suppose several applications simultaneously update a rate table that resides on DASD. When an application updates the table, it locks the table, reads part of the table into a buffer area in its address space, updates the table, writes the changes back to DASD, and unlocks the table. This creates contention among the applications trying to access that table as well as consuming I/O resources in the computer.

There are few realistic solutions to lessen the contention and consumption of resources caused by such activities. For example, each application cannot load a separate copy of the table into a dataspace because updates would not be uniformly applied to the table. Using client-server structures or cross-memory techniques to direct all updates to a single application that processes the updates against the rate table in its dataspace merely transforms the problem from DASD I/O contention into application I/O and/or memory contention.

Thus, there is a need in the art for a method of sharing accesses to global dataspaces among several concurrently executing applications, which method can be invoked by the applications programmer through a familiar, easy to implement, interface.

SUMMARY OF THE INVENTION

To overcome the limitations in the prior art described above, and to overcome other limitations that will become apparent upon reading and understanding this specification, the present invention discloses a method of sharing dataspaces among a plurality of applications operating under the MVS/ESA operating systems on IBM mainframe computers. A DataServ Routing Table (DSRT) is "anchored" in an extended command storage area (ECSA) using a pointer stored in a SubSystem Communications Vector Table (SSCVT) that also resides in the ECSA. The DSRT identifies all DataServ tasks by maintaining pointers to DataServ Vector Tables (DSVTs), which are created by the DataServ tasks in the ECSA. Each DSVT contains a pointer to a DataServ task, as well as pointers to associated Dataspace Information Element (DSIE) and DataServ Application Descriptor (DSAD) pools. The DSIEs contain a description of each dataspace created by the DataServ task. The DSADs contain a description of each application currently accessing a dataspace created by the DataServ task. Each DataServ task is responsible for creating one or more dataspaces, mapping a linear dataset to the dataspace, and then making the dataspace available to authorized applications by creating its associated DSVTs, DSIEs, and DSADs. An application communicates with the DataServ task through a DataServ Application Interface (DSAPPL), which is a set of service routines for accessing the DSRT, DSVT, DSIEs, and DSADs to provide direct addressability to the dataspaces.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings that form a part hereof, and in which is shown by way of illustration a specific embodiment in which the invention may be practiced. It is to be understood that other embodiments may be used and structural changes may be made without departing from the scope of the present invention.

In the following description, several control blocks are referred to in illustrating the logic of the present invention. These control blocks are defined near the end of the specification in conjunction with FIGS. 7–12.

The present invention provides an access method that makes it possible for multiple address spaces, i.e., multiple copies of any high level language (HLL), problem-state application, to access a single dataspace. Shared dataspaces solve problems encountered by applications that use very large data areas in virtual storage. Large data areas, such as tables, arrays, matrices, data base buffers, temporary work files, and copies of permanent data sets, can be loaded into virtual memory and shared by multiple applications, thereby lessening resource contention caused by shared DASD, cross-memory accesses, or client-server structures. Shared dataspaces provide an increase in the efficiency of resource utilization and a decrease in resource contention.

Generally, the goals of the present invention include, but are not limited to, the following:

(1) allow for growth of data areas up to the architectural limit of 2 gigabytes;
(2) eliminate multiple copies of identical data areas in virtual storage;
(3) eliminate contention on VSAM linear datasets;
(4) reduce Real Storage Manager (RSM) contention/overhead;
(5) reduce Auxiliary Storage Manager (ASM) contention/overhead;
(6) provide virtual storage constraint relief;
(7) reduce I/O activity to the VSAM linear datasets; and
(8) provide a simple programming interface for HLL, problem-state applications.

To accomplish these goals, the present invention discloses a programming interface comprising a set of service routines for accessing shared dataspaces that can be invoked by applications programmers through a familiar, easy to implement, interface. The programming interface provided by the present invention is similar to other access methods familiar to every applications programmer, e.g., QSAM, VSAM, etc. As with any access method, the programmer must identify the required object, and know the protocol required to communicate with the access method. However, with the present invention, the programmer does not need to acquire in-depth knowledge of the internals of the MVS/ESA operating system, thereby boosting productivity

GENERAL DESCRIPTION OF THE DATASERV SUBSYSTEM

Figure 1:
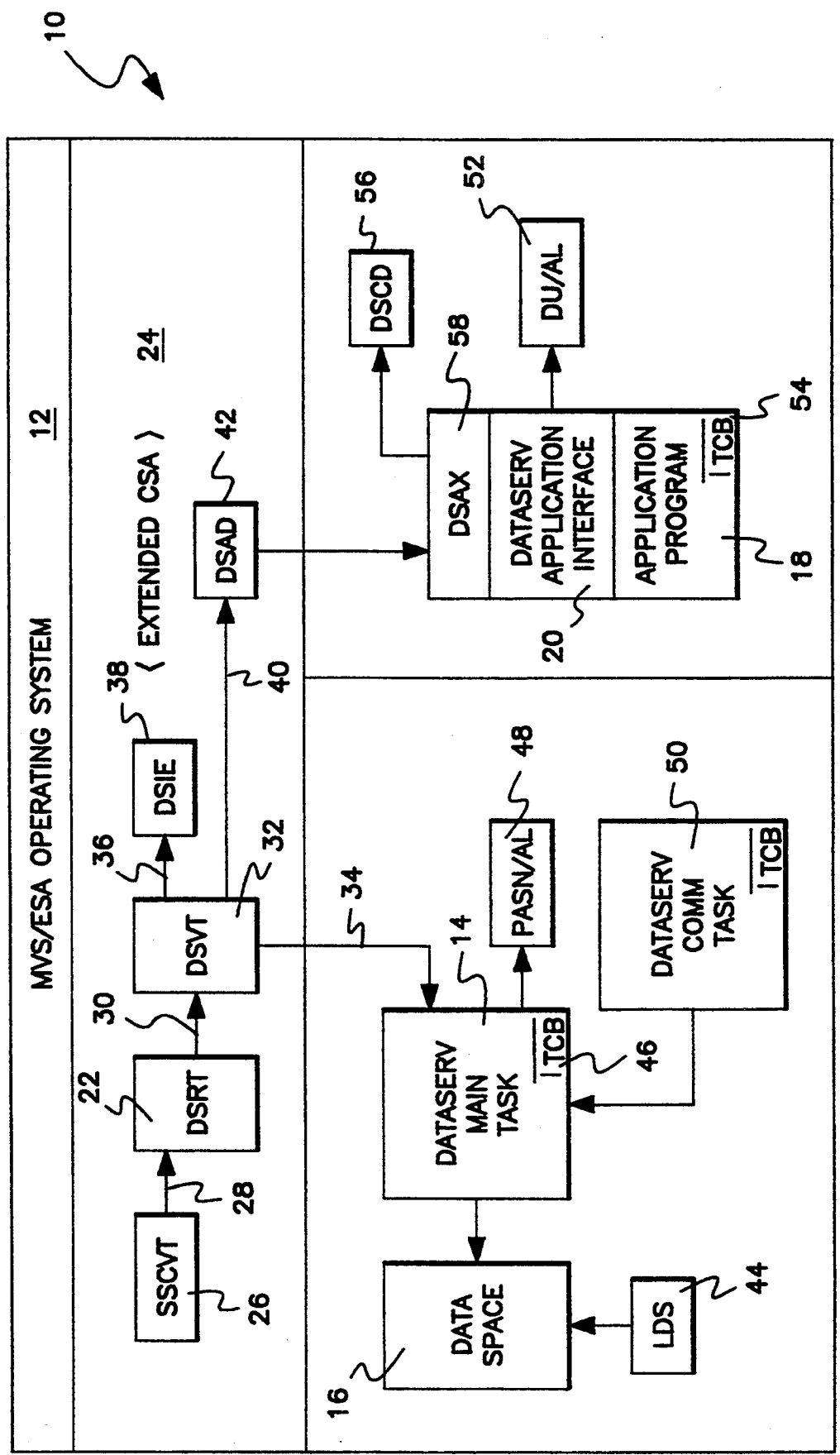
FIG. 1 is a block diagram of the preferred embodiment of the present invention.

Refer now to FIG. 1, which is a block diagram of the preferred embodiment of the present invention, defined as a "Dataspace Services (DataServ) Subsystem." The preferred embodiment of the DataServ Subsystem is designed for IBM mainframe computers 10 operating under the MVS/ESA operating system 12. Nonetheless, those skilled in the art will recognize that the techniques described herein have applicability across a wide range of computer platforms and operating system environments.

The DataServ Subsystem is generally comprised of three main components:

(1) A DataServ task 14 that establishes one or more dataspaces 16;
(2) A HLL, problem-state application 18; and
(3) A DataServ Application Interface (DSAPPL) 20 that communicates with the DataServ task 14 and provides data transfer services between the dataspace 16 and the application 18.

Global addressability to the dataspace 16 created by the DataServ task 14 is achieved through the use of a MVS Subsystem Interface (SSI) provided by the MVS/ESA operating system 12. The SSI provides a standard interface used by system (IBM or user-written) routines to make requests of or pass information to subsystems. The SSI acts only as a mechanism for transferring control from a system routine to the subsystem; it does not perform any subsystem functions itself. Those skilled in the art will recognize that an installation can design its own subsystem and use the SSI to invoke its functions.

A DataServ Subsystem Initialization Routine (DSSSIR) activates and initializes the DataServ Subsystem. The DSSSIR is scheduled by a master subsystem in the MVS/ESA operating system 12 at IPL (Initial Program Load) time. The primary function of the DSSSIR is to obtain storage for a DataServ Router Table (DSRT) 22, described further below in conjunction with FIG. 7. The DSRT 22 is located by the DSSSIR in an Extended Common Storage Area (ECSA) 24 provided by the MVS/ESA operating system 12. The ECSA 24 is a system data area managed by the MVS/ESA operating system 12 that can be addressed by any privileged program executing in the computer 10.

The DSRT 22 is "anchored" in the ECSA 24 by a SubSystem Communications Vector Table (SSCVT) 26, which stores a pointer 28 to the DSRT 22. The SSCVT 26 is a standard component of the MVS/ESA operating system 12 that resides in the ECSA 24 at a particular location.

The DSRT 22 identifies a particular DataServ task 14 by storing a pointer 30 to a DataServ Vector Table (DSVT) 32, described further below in conjunction with FIG. 8. The DSRT 22 manages a plurality of concurrently executing DataServ tasks 14 by maintaining a list of pointers 30 identifying all DSVTs 32 and thus all active DataServ tasks 14.

Once the anchor point has been established in the SSCVT 26 and the DSRT 22 has been created in the ECSA 24, individual DataServ tasks 14 may be activated and initialized. The activation and initialization of the DataServ tasks 14 is directed by JCL statements.

Table I illustrates sample JCL statements for activating and initializing a DataServ task 14. The "//DATASERV" statement identifies the program code for the DataServ task 14; the "//DSCNTL" statement identifies the PARMLIB dataset containing the parameters for the dataspaces 16 to be created by the DataServ task 14; the "//SYSUDUMP" statement directs the printing location for any dump; and the "//ldsdd" statement identifies the name of a dataspace 16 and the linear dataset 44 to load therein. In the preferred embodiment, each DataServ task 14 is limited to 256 dataspaces 16, although those skilled in the art will recognize that this is an arbitrary limit that can be easily changed.

DATASERV INITIALIZATION LOGIC

Figure 2:
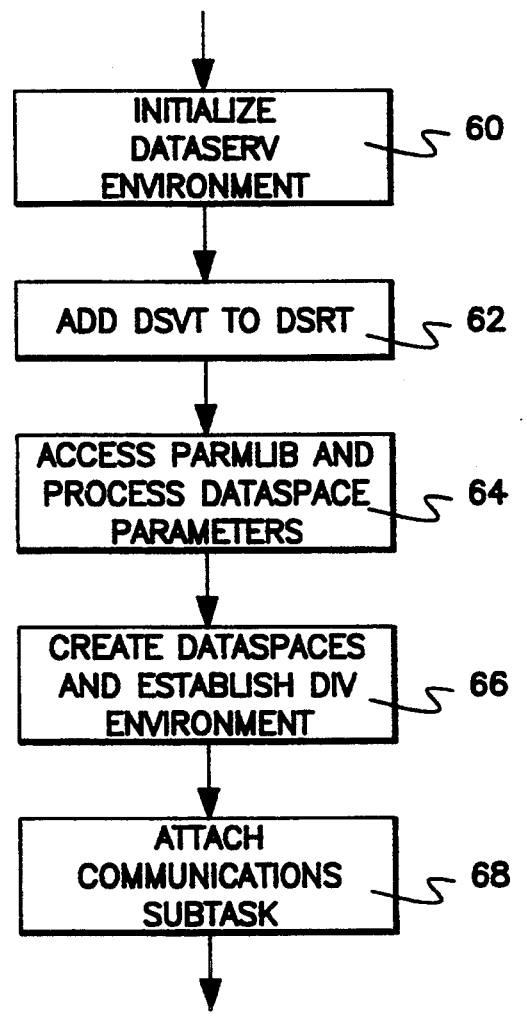
FIG. 2 is a flow chart that illustrates the steps taken during initialization of the DataServ task.

FIG. 2 is a flow chart that illustrates the steps taken during initialization of the DataServ task 14.

Block 60 represents the steps performed to initialize the environment of the DataServ task 14. The initialization steps are controlled by a DSMAIN routine, which is the main routine of the DataServ task 14. The DSMAIN routine acquires a main task work area and informs an operator console that initialization has begun. The DataServ task 14 also switches to a supervisory state with a protection key of 0 so that it may perform privileged functions on control blocks contained within the ECSA 24.

During initialization, a DSVT 32 is created by the DataServ task 14 in the ECSA 24 to act as its central control point. Each DSVT 32 contains an Event Control Block 34 for the DataServ task 14, as well as a pointer 36 to a Dataspace Information Element (DSIE) pool 38 and a pointer 40 to a DataServ Application Descriptor (DSAD) pool 42. The DSIEs 38, described further below in conjunction with FIG. 9, contain a description of each dataspace 16 created by the DataServ task 14. The DSADs 42, described further below in conjunction with FIG. 10, contain a description of each application 18 currently accessing a dataspace 16 created by the DataServ task 14.

Block 62 represents the steps performed to add the DSVT 32 to the DSRT 22. The DSMAIN routine calls a DSRSRV routine whose primary function is to manage the DSRT 22. The DSRSRV routine locates the DSRT 22 via the anchor pointer 28 in the SSCVT 26 and enqueues on the DSRT 22 using an ENQ macro-instruction. The enqueue performs a semaphore function that prevents other tasks from accessing the DSRT 22 until the DSRSRV routine dequeues from the DSRT 22. After the DSRSRV routine gains access to the DSRT 22, it validates the address of the DSVT 32, updates a free entry in the DSRT 22 to point to the DSVT 32, and increments an active DataServ counter in the DSRT 22. The DSRSRV routine then dequeues from the DSRT 22 using a DEQ macro-instruction and returns to the DSMAIN routine.

When control is returned from the DSRSRV routine, the DSMAIN routine locks the DSVT 32 to prevent concurrent accesses via a call to a DSLOCK routine. The DSLOCK routine is a lock manager that locks, unlocks, verifies locks, and verifies unlocks on the DSVT 32 to prevent concurrent access thereto. Once the DSVT 32 is locked, a status flag therein is set to indicate that the DSVT 32 is being initialized. A pointer to the DSVT 32 is stored in the DataServ task 14 so that the DSVT 32 can be addressed without traversing the SSCVT 26 and DSRT 22. A SYSEVENT macro-instruction is issued to render the DSMAIN routine non-swappable. A storage pool for the DSIEs 38 is acquired in the ECSA 24 and the pointer 36 to the DSIES 38 is stored in the DSVT 32.

Block 64 represents the steps performed to access and process the PARMLIB statements that specify the parameters of each dataspace 16, such as size, name, storage key, and protection attributes. A DSPLIB routine is called to perform a syntax check on the PARMLIB statements passed to it by the MVS/ESA operating system 12. The DSPLIB routine builds individual DSIEs 38 using the PARMLIB statements.

Block 66 represents the steps performed to create the dataspaces 16 and establish a DIV environment. After the DSPLIB routine builds the DSIEs 38, the DSMAIN routine calls a DSINIT routine to create and establish addressability to the dataspaces 16 identified by the DSIEs 38. The DSIEs are scanned and dataspaces 16 identified by the DSIEs 38 are created by invoking a DSPSERV macro-instruction and specifying thereon the characteristics of the dataspace 16 according to information contained in the DSIEs 38, including the size, name, storage key, and protection attributes of the dataspace 16. The DSPSERV macro-instruction assigns ownership of the dataspace 16 to a Task Control Block (TCB) 46 associated with the DataServ task 14, and upon completion returns a STOKEN variable identifying the dataspace 16. The DSINIT routine also will establish the DIV environment, if required, for each dataspace 16.

Following the receipt of the STOKEN, the DataServ task 14 invokes an ALESERV macro-instruction to add the STOKEN to a Primary Address Space Access List (PASN-AL) 48 attached to the TCB 46. The PASN-AL 48 is a standard component of the MVS/ESA operating system 12 and the presence of the STOKEN on the PASN-AL 48 provides the DataServ task with direct addressability to the dataspace 16. The ALESERV macro-instruction returns an index (ALET) for the STOKEN in the PASN-AL 48, which the DataServ task 14 stores in the DSIE 38 associated with the dataspace 16, along with the STOKEN, the origin address of the dataspace 16, and any DIV information.

When control is returned from the DSINIT routine, the DSMAIN routine acquires a storage pool for the DSADs 42 in the ECSA 24 for managing the connections between the DataServ task 14 and the applications 18. After the DSADs 42 are created, the DSVT 32 is updated with a pointer 40 to the DSADs 42.

Block 68 represents the steps performed to attach a communications subtask (DSCOMM) 50 to the address space of the DataServ task 14 to provide communication support to the operator console. The DSCOMM 50 supports communications with an operator console, including the transmission of informational and error messages to the operator console, as well as the receipt of operator commands that control the operation of the DataServ task 14.

Once the DSCOMM 50 is attached, the status flag in the DSVT 32 is set to indicate that the DataServ task 14 is active and the DSVT 32 is unlocked so that it may be accessed by an application 18. The operator console is then informed that initialization is complete. Finally, both the DataServ task 14 and the DSCOMM 50 go into a "wait state," to await the next event, be it communications from the operator console, etc.

APPLICATION CONNECT LOGIC

The sequence used by applications 18 in the present invention to access dataspaces 16 is similar to the familiar "open, read, close" processing used by applications 18 to access datasets 44. An application 18 communicates with the DataServ task 14 through the DSAPPL 20, which is a set of service routines for accessing the DSRT 22, DSVTs 32, DSIEs 38, and DSADs 42 to provide direct addressability to the dataspaces 16 created by the DataServ task 14. In the present invention, an application 18 can make three types of calls to the DSAPPL 20: 1) initialization; 2) access; and 3) end-of-job.

Figure 3:
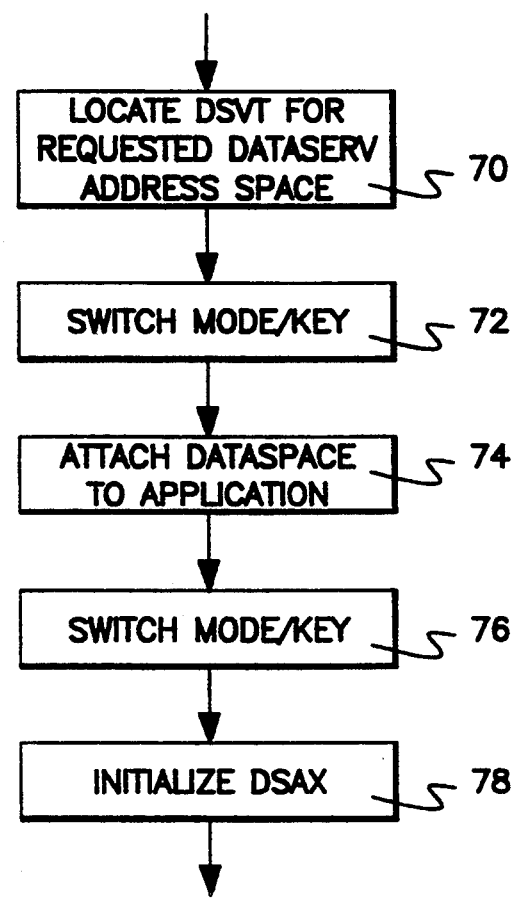
FIG. 3 is a flow chart that illustrates the steps taken when an initialization call is made by the application to connect to the DataServ task.

FIG. 3 is a flow chart that illustrates the steps taken when an initialization call is made by the application 18 to connect to the DataServ task 14.

Block 70 represents the steps performed to locate the DSVT 32 for a desired DataServ task 14. The application 18 identifies by name both the DataServ task 14 and the dataspaces 16 to be attached to the application 18. The name of the desired DataServ task 14 and the name of the desired dataspace 16 are supplied to the DSAPPL 20 via a parameter list, described further below in conjunction with FIG. 12.

The DSAPPL 20 establishes communications with the DataServ task 14 using the DSRSRV routine. The DSRSRV routine locates the DSRT 22 via the anchor pointer 28 in the SSCVT 26 and enqueues on the DSRT 22 using the ENQ macro-instruction. After the DSRSRV routine gains access to the DSRT 22, it searches the DSRT 22 for the job name of the DataServ task 14 supplied by the application 18 in the parameter list. The pointer 30 to the corresponding DSVT 32 is returned to the DSAPPL 20 when a match is found; otherwise an error code is returned to the application 18. The DSRSRV routine then dequeues from the DSRT 22 using the DEQ macro-instruction and returns to the DSMAIN routine.

Block 72 represents the steps performed to switch the mode/key of the application 18. The DSAPPL 20 invokes a supervisor call (SVC) for a mode/key switch to a supervisory state with a protection key of 0 to perform certain restricted functions. The restricted functions include locking the DSVT 32 via a call to the DSLOCK routine.

Block 74 represents the steps performed to attach the dataspace 16 to the application 18. With the DSVT 32 locked, the DSAPPL 20 invokes a DSATCH routine to "attach" the desired dataspace 16 to the application 18. The DSATCH routine searches the DSIEs 38 to find a dataspace 16 that matches the dataspace 16 name supplied by the application 18 in the parameter list; otherwise an error indication is returned to the application 18.

Once the dataspace 16 is found, it is attached to the application 18 by retrieving the STOKEN identifying the dataspace 16 from the associated DSIE 38. The ALESERV macro-instruction is invoked to add the STOKEN to a Dispatchable Unit Access List (DU-AL) 52 attached to a TCB 54 of the application 18. The DU-AL 52 is a standard component of the MVS/ESA operating system 12 and the addition of the STOKEN to the DU-AL 52 provides the application 18 with direct addressability to the dataspace 16, in the same manner as the addition of the STOKEN on the PASN-AL 48 of the DataServ task 14. However, the DU-AL 52 is used rather than the PASN-AL 48 to limit access to dataspace 16 to the TCB 54 of the application 18; in contrast, all TCBs in an address space can access a dataspace 16 on the PASN-AL 48.

Upon its completion, the ALESERV macro-instruction returns the ALET index for the STOKEN on the DU-AL 52. The DSAPPL 20 stores the STOKEN and ALET in a DataServ Connection Descriptor (DSCD) 56, described further below in conjunction with FIG. 11. The DSCDs 56, which reside in the address space of the application 18, are used by the application 18 to manage connections with the dataspaces 16. The DSVT 32 is then unlocked via a call to the DSLOCK routine.

Block 76 represents the steps performed to switch the mode/key of the application 18. The DSAPPL 20 invokes a SVC for a mode/key switch back to a problem state with a user protection key.

Block 78 represents the steps performed to locate and load a desired Dataspace Access Exit (DSAX) routine 58. The DSAX routine 58 is prepared in advance to provide customized access to dataspaces 16 for the application 18. Using the DSAX routine 58, an application 18 can access data in the dataspace 16 much as it would access a dataset 44 on standard DASD. As with any access method, the application 18 must know the format of the data, and must describe the record or block it wants to access. However, the DataServ Subsystem does not lock the programmer into any particular data format. The dataspace 16 may be arranged in any logical structure to meet the needs of the application 18. For example, the DSAX routine 58 may support dataspaces 16 formatted as sequential fixed length records, sequential variable length records, keyed sequential records, inverted file structures, etc.

APPLICATION ACCESS LOGIC

Figure 4:
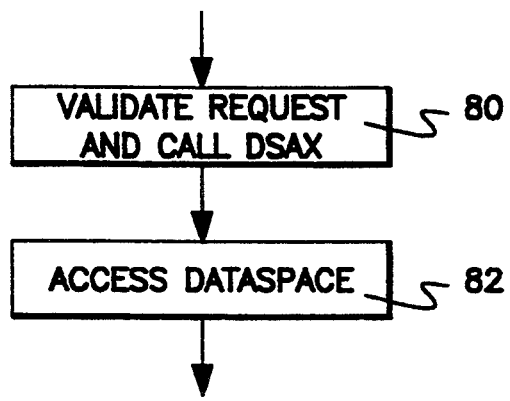
FIG. 4 is a flow chart that illustrates the steps taken when an access call is made by the application to the dataspace.

FIG. 4 is a flow chart that illustrates the steps taken when an access call is made by the application 18 to the dataspace 16.

Block 80 represents the steps performed to validate the request and to call the DSAX routine 58. When the application 18 makes an access call to the DSAPPL 20, it identifies by name both the DataServ task 14 and the previously attached dataspace 16 it wishes to access. Communications with the DataServ task 14 are established via the DSVT 32 using the DSRSRV routine. The DSRSRV routine locates the DSRT 22 via the anchor pointer 28 in the SSCVT 26 and enqueues on the DSRT 22 using the ENQ macro-instruction. After the DSRSRV routine gains access to the DSRT 22, it searches the DSRT 22 for the job name of the DataServ task 14 supplied by the application 18 in the parameter list. The pointer 30 to the DSVT 32 is returned to the DSAPPL 20 when a match is found; otherwise an error code is returned. The DSRSRV routine then dequeues from the DSRT 22 using the DEQ macro-instruction and returns to the DSMAIN routine. The DSAPPL 20 checks the status of the DataServ task 14 via the DSVT 32, as well as the status of the connection with the application 18 via the DSAD 42. The parameter list from the application 18 is passed to the DSAX routine 58, which checks the dataspace 16 status via the DSIE 38 and validates the parameter list from the application 18.

Block 82 represents the steps performed to access the dataspace 16. The DSAX routine 58 searches the DSCDs 56 for a dataspace 16 that matches the name supplied by the application 18; otherwise an error indication is returned. Once a matching DSCD 56 has been found, the ALET identifying the STOKEN of the dataspace 16 is retrieved from the DSCD 56 and stored in an access register.

Upon entry to the DSAX routine 58, the application 18 is in "primary address space control (ASC)" mode, a standard operating mode of the MVS/ESA operating system 12, wherein the contents of general purpose registers are resolved to a specific location in the address space of the application 18. After the ALET is stored in the access register, the DSAX routine 58 switches to "access register (AR)" ASC mode, an optional operating mode of the MVS/ESA operating system 12, so that it can directly address the dataspace 16 using the contents of both the general purpose registers and the access register. While in AR ASC mode, the DSAX routine 58 can move, compare or perform operations directly on data in the dataspace 16.

Once the operations in the dataspace 16 are completed, the DSAX routine 58 switches back to primary ASC mode, sets a return code, and returns control to the DSAPPL 20. Upon receiving control from the DSAX routine 58, the DSAPPL 20 checks the return code and passes it to the application 18.

APPLICATION DISCONNECT LOGIC

Figure 5:
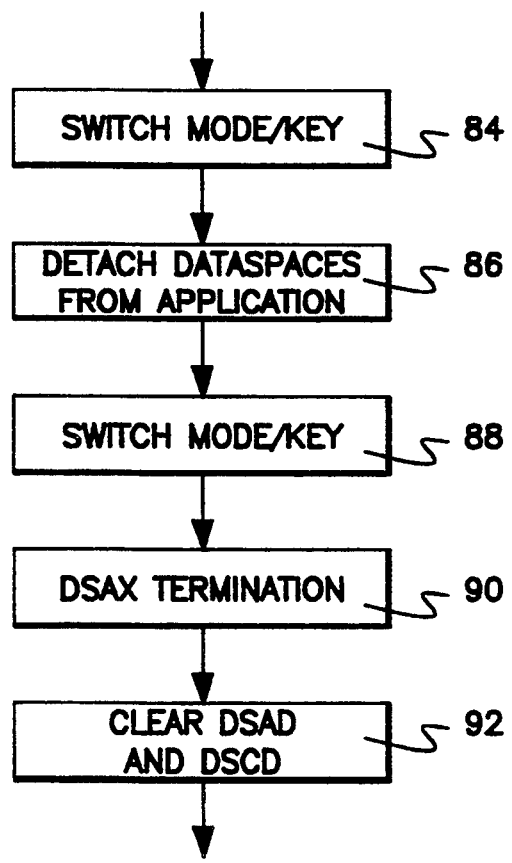
FIG. 5 is a flow chart that illustrates the steps taken when an end-of-job call is made by the application.

FIG. 5 is a flow chart that illustrates the steps taken when an end-of-job call is made by the application 18. After completing its accesses to the dataspace 16, the application 18 may detach from the dataspace 16 via an end-of-job call.

Block 84 represents the steps performed to switch the mode/key of the application 18. When the application 18 makes an end-of-job call, it identifies by name both the DataServ task 14 and the dataspaces 16 to be detached. The DSAPPL 20 establishes communications with the DataServ task 14 via the DSVT 32 using the DSRSRV routine. The DSRSRV routine locates the DSRT 22 via the anchor pointer 28 in the SSCVT 26 and enqueues on the DSRT 22 using the ENQ macro-instruction. After the DSRSRV routine gains access to the DSRT 22, it searches the DSRT 22 for the job name of the DataServ task 14 supplied by the application 18 in the parameter list. The pointer 30 to the DSVT 32 is returned to the DSAPPL 20 when a match is found; otherwise an error code is returned. The DSRSRV routine then dequeues from the DSRT 22 using the DEQ macro-instruction and returns to the DSAPPL 20. The DSAPPL 20 checks the status of the DataServ task 14 and then invokes a SVC to perform a mode/key switch to the supervisory state with a protection key of 0. While in the supervisory state, the DSAPPL 20 performs several restricted functions.

Block 86 represents the steps performed to detach the dataspaces 16 from the application 18. The DSVT 32 is locked via the DSLOCK routine and the application 18 is detached from the dataspace 16 by a DSDTCH routine. The DSDTCH routine makes a search of the DSCDs 56 to match the dataspace 16 name provided by the parameter list with the dataspace 16 names stored in the DSCDs 56. When a match is found, the ALET is retrieved from the DSCD 56 and used with the ALESERV macro-instruction to remove the STOKEN associated with the dataspace 16 from the DU-AL 52 of the application 18. The DSVT 32 is then unlocked via a call to the DSLOCK routine.

Block 88 represents the steps performed to switch the mode/key of the application 18. The DSAPPL 20 invokes a SVC for a mode/key switch back to a problem state with a user protection key.

Block 90 represents the steps performed by the DSAX routine 58 for termination. The DSAX routine 58 is called to perform any necessary housekeeping and the DSAX work area is freed.

Block 92 represents the steps performed to clear the DSAD 42 associated with the application 18 and the DSCD 56 associated with the dataspace 16. As a result of the detachment, both an active dataspace counter at the beginning of the DSCD 56 pool and the dataspace use counter in the DSIE 38 are decremented. In addition, if the application 18 is no longer attached to any dataspaces 16 owned by the DataServ task 14, then the DSAD 42 is freed and the active application counter at the beginning of the DSAD 42 pool is decremented.

DATASERV TERMINATION LOGIC

Figure 6:
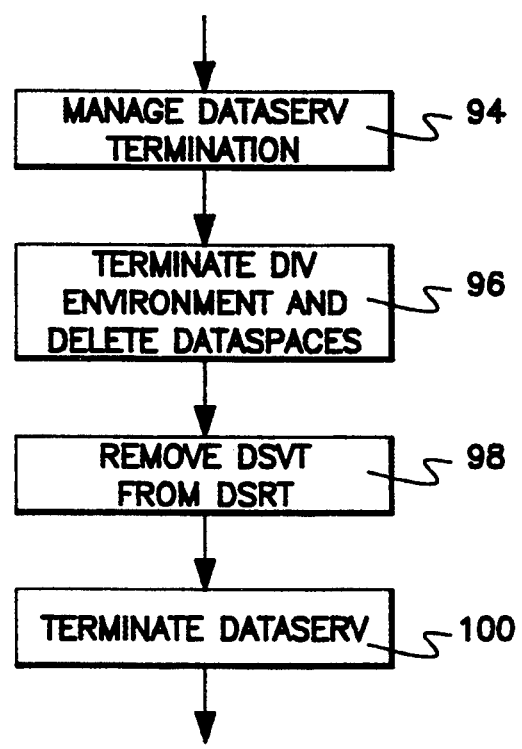
FIG. 6 is a flow chart that illustrates the steps taken when during the termination of a DataServ task.

FIG. 6 is a flow chart that illustrates the steps taken when during the termination of a DataServ task 14.

Block 94 represents the steps performed to manage a DataServ task 14 termination as directed by the DSCOMM communications subtask 50. When the DataServ task 14 is instructed to terminate via an operator command, the DSMAIN routine detaches from the DSCOMM communications subtask 50.

Block 96 represents the steps performed to terminate the DIV environment and delete the dataspaces 16. A DSTERM routine uses the DSIEs 38 to control the deletion of dataspaces 16. Each DSIE 38 is scanned and the DIV environment is shutdown, if required. The ALET from the DSIE is used to remove the STOKEN from the PASN-AL 48 by invoking the ALESERV macro-instruction. The associated dataspace 16 is deleted by invoking the DSPSERV macro-instruction using the STOKEN from the DSIE. After all DSIEs 38 have been processed, the DSIEs 38 are freed and the pointer 36 thereto in the DSVT 32 is updated.

Block 98 represents the steps performed to remove the DSVT 32 from the DSRT 22. The DSCOMM 50 locks the DSVT 32 via the DSLOCK routine and sets the status flag therein to indicate termination. It forces still existing applications 18 to disconnect from the DataServ task 14 by freeing the DSADs 42. The DSRSRV routine is called to locate the DSRT 22 via the anchor pointer 28 in the SSCVT 26 and to enqueue on the DSRT 22 using the ENQ macro-instruction. After the DSRSRV routine gains access to the DSRT 22, it removes the DSVT 32 from the DSRT 22 by zeroing the pointer 28 and decrementing the active DataServ counter. The DSRSRV routine then dequeues from the DSRT 22 using the DEQ macro-instruction and returns to the DSMAIN routine. Upon return to the DSMAIN routine, the DSVT 32 is unlocked via the DSLOCK routine and released, and the address space of the DataServ task 14 is terminated.

CONTROL BLOCK DEFINITIONS

A number of control blocks are referred to in the above discussion of the present invention. The following descriptions and the Figures referred to therein define these control blocks.

Figure 7:
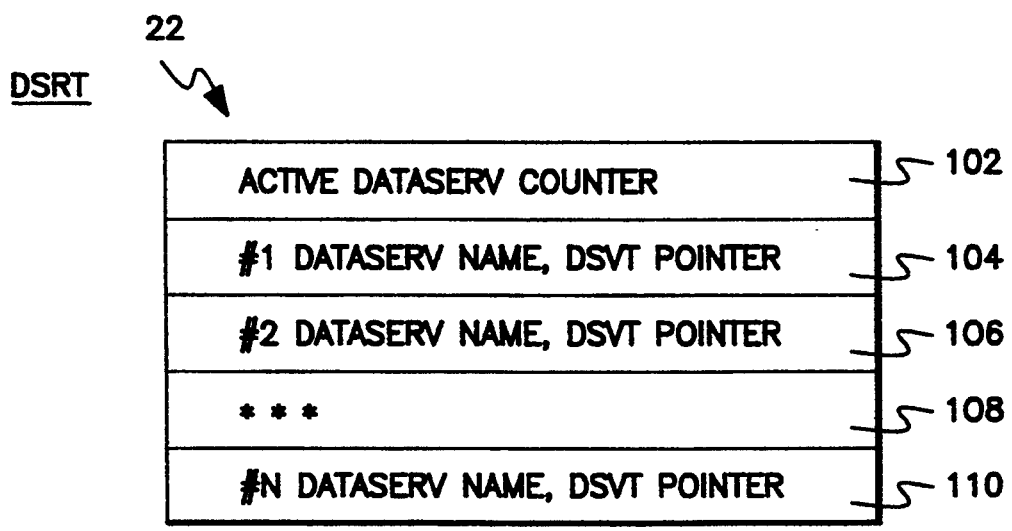
FIG. 7 is a block diagram describing the DataServ Routing Table control block.

FIG. 7 is a block diagram describing the DSRT 22. The DSRT 22 is comprised of the active DataServ counter 102 and a plurality of entries 104-110 corresponding to active DataServ tasks 14. Each entry 104-110 contains a job name of the DataServ task 14 and a pointer 30 to the associated DSVT 32.

Figure 8:
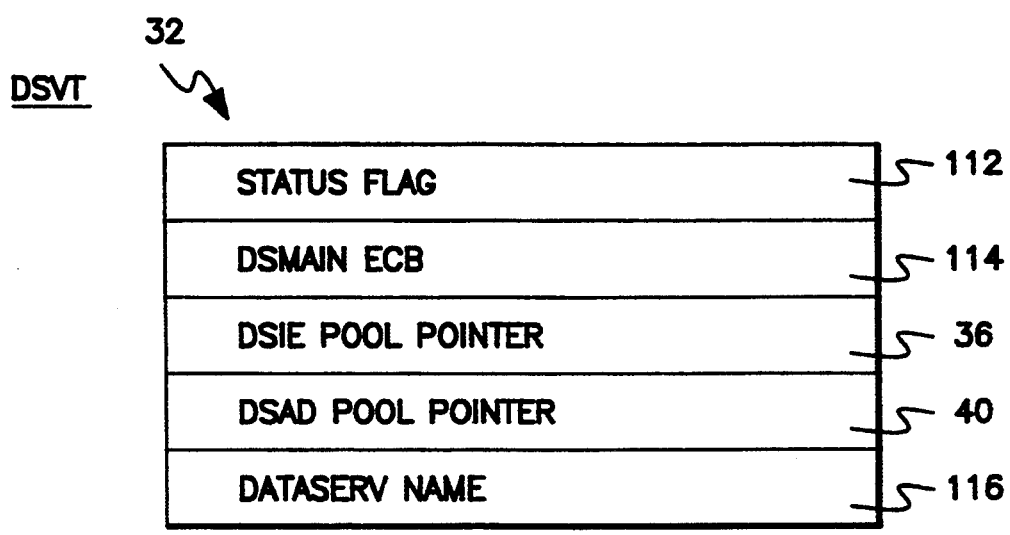
FIG. 8 is a block diagram describing the DataServ Vector Table control block.

FIG. 8 is a block diagram describing the DSVT 32 which contains, for every DataServ task 14, the status flag 112, an Event Control Block (ECB) 114 pointing to a main routine (DSMAIN) in the DataServ task 14, the pointer 36 to the DSIEs 38, the pointer 40 to the DSADs 42, and the job name 116 of the DataServ task 14.

Figure 9:
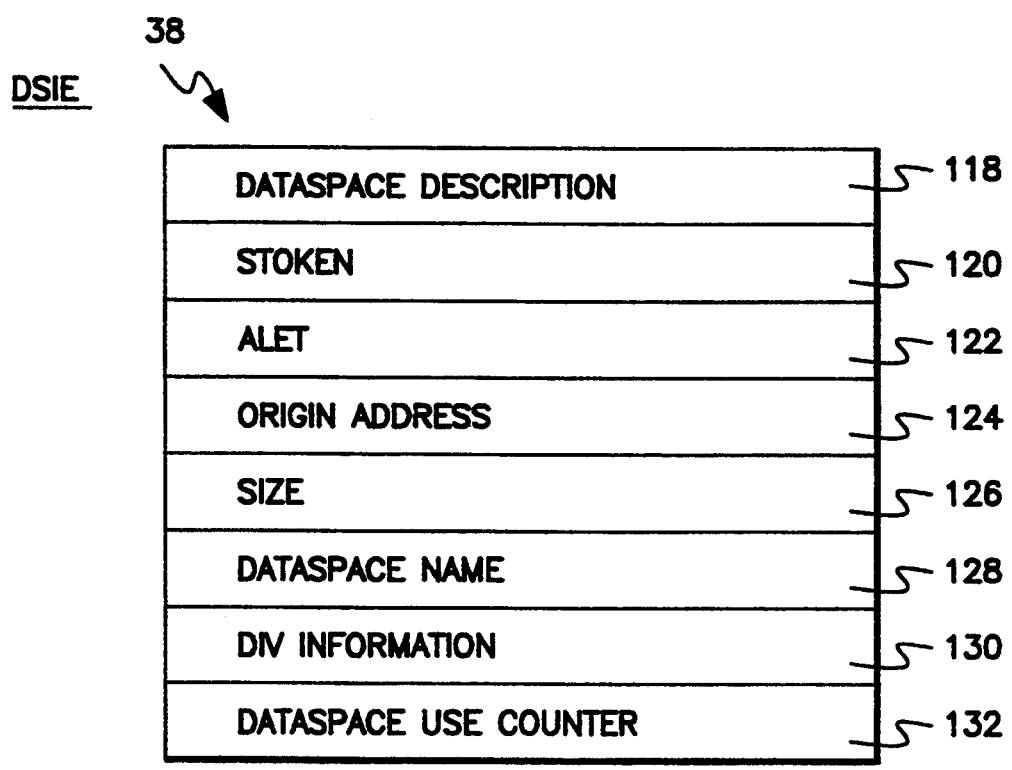
FIG. 9 is a block diagram describing the Dataspace Information Element control block.

FIG. 9 is a block diagram describing the DSIE 38 which contains, for every dataspace 16 owned by the DataServ task 14, a description 118 of the dataspace 16, the STOKEN 120 identifying the dataspace 16, the ALET index 122 to the PASN-AL 48 where the STOKEN is stored, a dataspace origin address 124, a dataspace size 126, a dataspace name 128, any required DIV information 130, and the dataspace use counter 132.

Figure 10:
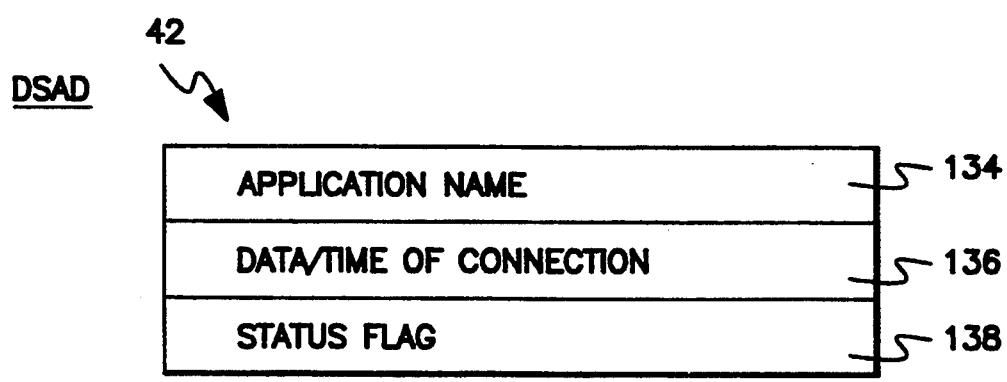
FIG. 10 is a block diagram describing the DataServ Application Descriptor control block.

FIG. 10 is a block diagram describing the DSAD 42 which contains, for every application 18 connected to the DataServ task 14, a job name 134 of the application 18, a date and time 136 of the initial connection, and a status flag 138. In addition, the active application counter (not shown) resides at the beginning of the DSAD pool 42.

Figure 11:
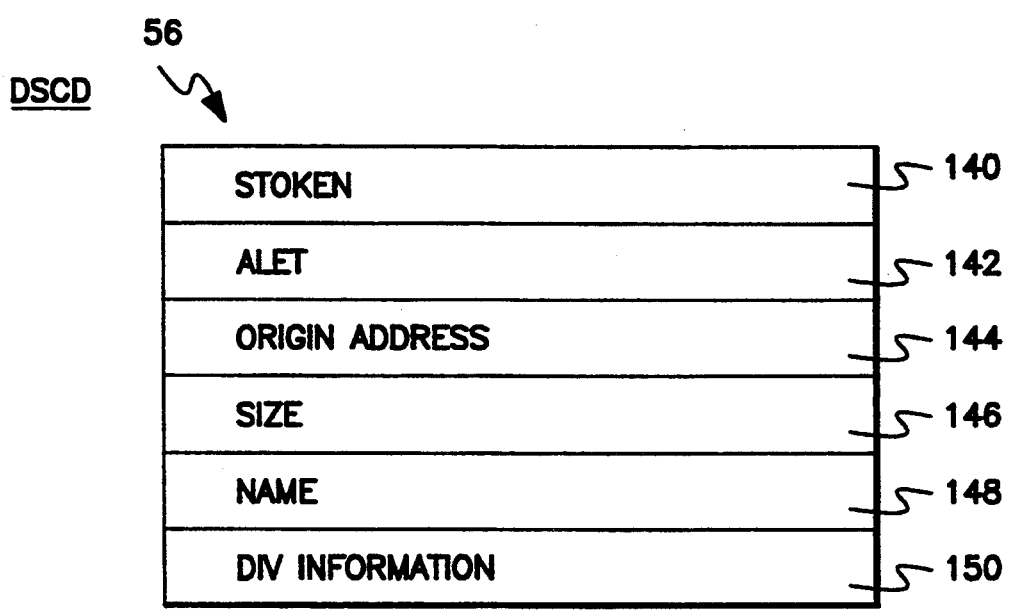
FIG. 11 is a block diagram describing the DataServ Connection Descriptor control block.

FIG. 11 is a block diagram describing the DSCD 56 which contains, for every dataspace 16 attached to the application 18, the STOKEN 140 identifying the dataspace 16, the ALET index 142 to the DU-AL 52 where the STOKEN is stored, a dataspace origin address 144, a dataspace size 146, a dataspace name 148, and any required DIV information 150. In addition, the active dataspace counter (not shown) resides at the beginning of the DSCD pool 56.

Figure 12:
FIG. 12 is a block diagram describing the DSAPPL parameter list that is comprised of full words pointing to data in a standard COBOL format.

FIG. 12 is a block diagram describing the DSAPPL 20 parameter list 152 which is comprised of full words pointing to data in a standard COBOL format. A BLOCK parameter 154 contains a binary relative block number that is used during access calls to identify a specific block of data in the dataspace 16. A KEY parameter 156 contains a value that is used during access calls to identify a record within the block of data. A BUFFER parameter 158 contains an address to a working storage area within the address space of the application 18 that is used during access calls to move data to or from the dataspace 16. A WORK AREA parameter 160 is used to store an address to a working storage area within the DataServ task 14 during initialization and access calls. A CALL CODE parameter 162 contains either "I," "A," or "E" to indicate the type of call. A DSAX NAME parameter 164 contains a left justified, blank padded name of the DSAX routine 58 to use during access calls. A SYSTEM NAME parameter 166 contains the job name of a target DataServ task 14. A DATASPACE LIST parameter 168 contains a two-byte binary number of the dataspaces 16 managed by the DataServ task 14 followed by a list of left justified, blank padded, 8 byte dataspace 16 names (this is returned to the application 18 on initialization calls). A DATASPACE NAME parameter 170 contains the name of a target dataspace 16 for access calls. An APPLICATION ID parameter 172 contains the RACF ID of the application for access calls (for future security features). A USER PARAMETER LIST parameter 174 contains a pointer to an optional parameter list that may be passed to the DSAX routine 58 to provide forward compatibility if additional parameters are required by a DSAX routine 58.

DATASERV OPERATOR INTERFACE

In addition to the functions described above, the present invention also provides an operator interface for controlling the DataServ tasks 14 and their dataspaces 16. The DSCOMM 50 performs the functions of establishing communications with the operator console and processing operator commands. When the DSCOMM 50 receives a command, it checks the authority and syntax thereof, and if the command is authorized and correct, then the DSCOMM 50 calls a DSCMDE routine to execute the command. The DSCMDE routine supports a full set of operator commands that allow operations personnel to monitor and control the processing in the address spaces of the DataServ tasks 14, as described below:

STATUS. This command displays the status of the DataServ task 14, including the active application counter.

INFO, jobname | ALL. This command searches the DSADs 42 for specified active connections and displays the connection statistics associated with the DSADs 42. A "jobname" or "ALL" parameter is used with the command to specify that only DSADs 42 matching the parameter are to be displayed, or that all DSADs 42 are to be displayed.

SHOW, dataspace | ALL. This command searches the DSIEs 38 for specified active dataspaces 16 and displays the connection statistics associated with the DSIEs 38. A "dataspace" or "ALL" parameter is used with the command to specify that only DSIEs 38 matching the parameter are to be displayed, or that all DSIEs 38 are to be displayed.

DISCON, jobname | ALL. This command searches the DSADs 42 for specified active connections, locks the DSVT 32 associated with the DataServ task 14, interrupt the connections with one or more applications 18, decrements the active application counter at the beginning of the DSAD 42 pool, unlocks the DSVT 32, and then informs the operator of the results. A "jobname" or "ALL" parameter is used with the command to specify that only DSADs 42 matching the parameter are to be disconnected, or that all DSADs 42 are to be disconnected.

DELETE, dataspace. This command searches the DSIEs 38 for specified active dataspaces 16, locks the DSVT 32, marks the DSIEs 38 for deletion, decrements the active dataspace counter at the beginning of the DSAD 42 pool, unlocks the DSVT 32, and informs the operator of the results. A "dataspace" parameter is used with the command to specify that only DSIEs 38 matching the parameter are to be deleted.

SHUTDOWN. This command checks the active application counter at the beginning of the DSAD 42 pool, and if DataServ task 14 is not dormant, rejects the command. However, if the DataServ task 14 is dormant, this command will trigger the termination of the DataServ task 14.

RECLAIM. This command searches DSADs 42 for connections deleted by the operator, locks the DSVT 32, clears and frees any DSADs 42 for the deleted connections, and informs the operator of the result.

SYSTEMS. This command searches the DSRT 22 for active DataServ tasks 14, and displays the system name, status, connections, and active dataspaces 16 associated with each.

CONCLUSION

This concludes the description of the preferred embodiment of the invention. The following paragraphs describe some alternative implementations of the present invention.

The preferred embodiment envisions a read-only mode of access by the applications to the dataspaces, as indicated by the lack of discussion on serialization. However, those skilled in the art will recognize that serialization could be easily accomplished using a number of techniques, e.g., the ENQ/DEQ (enqueue/dequeue) macro-instructions provided by the MVS/ESA operating system. In one embodiment, applications could enqueue/dequeue using the DSVT as a semaphore to prevent concurrent accesses to the DataServ task. In an alternative embodiment, the applications could selectively enqueue/dequeue on a DSIE associated with a target dataspace to allow concurrent accesses to other dataspaces owned by the DataServ task while preventing concurrent accesses only to the targeted dataspace.

In summary, the present invention discloses a method of sharing dataspaces among a plurality of applications on IBM mainframe computers. A DataServ Routing Table (DSRT) is anchored in an extended command storage area (ECSA) by a pointer stored in a SubSystem Communications Vector Table (SSCVT), which also resides in the ECSA. The DSRT identifies all DataServ tasks using pointers to DataServ Vector Tables (DSVT), which are created by each DataServ task in the ECSA. Each DSVT contains a pointer to a DataServ task, as well as pointers to associated Dataspace Information Element (DSIE) and DataServ Application Descriptor (DSAD) pools. The DSIEs contain a description of each dataspace created by the DataServ task. The DSADs contain a description of each application currently accessing a dataspace created by the DataServ task. Each DataServ task is responsible for creating one or more dataspaces, mapping a linear dataset to the dataspace, and then making the dataspace available to authorized applications by creating its associated DSVT, DSIEs, and DSADs. An application communicates with the DataServ task through a DataServ Application Interface (DSAPPL), which is a set of service routines for accessing the DSRT, DSVT, DSIEs, and DSADs to provide direct addressability to the dataspaces.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

TABLE I

| //DATASERV | EXEC | PGM=DSMAIN |
|---|---|---|
| //DSCNTL | DD | DSN=parmlib dataset,DISP=SHR |
| //SYSUDUMP | DD | SYSOUT=D |
| //ldsdd | DD | DSN=linear dataset,DISP=SHR |

What is claimed is:

1. In an operating system executing on a computer, a method of sharing dataspaces among a plurality of applications executing in the computer, the method comprising steps of:
    (a) initializing a Dataspace Services (DataServ) Subsystem in the computer, the initializing step further comprising the steps of obtaining storage for a DataServ Router Table (DSRT) in an Extended Common Storage Area (ECSA) provided by the operating system, anchoring the DSRT by storing a pointer thereto in a SubSystem Communications Vector Table (SSCVT) residing in the ESCA, wherein the SSCVT is accessible through the operating system;
    (b) executing a DataServ task in the computer, the executing step further comprising the steps of obtaining storage for a DataServ Vector Table (DSVT) in the ECSA, storing a job name for the DataServ task and a pointer to the DSVT in the DSRT, creating one or more dataspaces by invoking a utility of the operating system which returns STOKENs identifying the created dataspaces, obtaining storage for Dataspace Information Elements (DSIEs) in the ECSA, storing a pointer to the DSIEs in the DSVT, and storing the STOKENs in the DSIEs associated with the created dataspaces;
    (c) executing an application in the computer, the executing step further comprising the steps of accessing the SSCVT via the operating system to retrieve the pointer to the DSRT, searching the DSRT for the job name of a particular DataServ task, accessing the DSRT to retrieve the pointer to the DSVT associated with the job name and thus the particular DataServ task, accessing the DSVT to retrieve the pointer to the DSIEs, searching the DSIEs for a name of a particular dataspace, accessing the DSIE to retrieve the STOKEN associated with the particular dataspace, and using the STOKEN to provide direct addressability to the dataspace; and
    (d) repeating the executing step (c) for a plurality of applications.

2. The method of claim 1, further comprising the step of executing a communications subtask to support communications with an operator console, wherein the executing step comprises the steps of transmitting informational and error messages to an operator console, and receiving operator commands from the operator console to control the DataServ task.

3. The method of claim 1, wherein the initializing step (a) further comprises maintaining a list of pointers in the DSRT identifying a plurality of DataServ tasks and a plurality of DSVTs associated with the DataServ tasks.

4. The method of claim 1, wherein the executing step (b) further comprises storing a pointer to one or more Dataspace Information Elements (DSIEs) in the DSVT, the DSIEs storing the STOKEN of each dataspace created by the DataServ task.

5. The method of claim 4, wherein the executing step (c) further comprises updating the DSIEs whenever a dataspace is created and deleted by the DataServ task.

6. The method of claim 1, wherein the executing step (b) further comprises storing a pointer to one or more DataServ Application Descriptors (DSADs) in the DSVT, wherein the DSADs store a description of each application accessing a dataspace created by the DataServ task.

7. The method of claim 6, wherein the executing step (c) further comprises updating the DSADs whenever the application connects to and disconnects from the dataspaces owned by the DataServ task.

8. The method of claim 1, wherein the executing step (c) further comprises storing a pointer to one or more DataServ Connection Descriptors (DSCDs) in the application, wherein the DSCDs store a description of each dataspace accessed by the application.

9. The method of claim 8, wherein the executing step (c) further comprises updating the DSCDs whenever the application attaches to and detaches from dataspaces owned by the DataServ task.

10. The method of claim 1, wherein the utility comprises a DSPSERV macro-instruction.

11. The method of claim 1, wherein the executing step (c) further comprises invoking a ALESERV macro-instruction to add the STOKEN to an access list associated with the application, wherein the ALE- SERV macro-instruction returns an access list index for the STOKEN, thereby providing the application with direct addressability to the dataspace.

12. The method of claim 11, wherein the access list comprises a Dispatchable Unit Access List, thereby limiting access to the dataspace to only the application.

13. The method of claim 11, wherein the executing step (c) further comprises switching into an access register (AR) address space control (ASC) mode so that the application can directly address the dataspace.

14. The method of claim 13, further comprising loading the access list index of the STOKEN identifying the dataspace into an access register so the contents of both a general purpose register and the access register are resolved to a specific location in the dataspace.

15. The method of claim 1, wherein the executing step (c) further comprises accessing the dataspace using a Dataspace Access Exit (DSAX) routine, the DSAX routine being prepared in advance to provide customized access to dataspaces for the application, wherein the dataspace is arranged in any logical structure.

16. A method of sharing data residing in a data-only address space among a plurality of applications executing in a computer, the method comprising the steps of:
   (a) initializing the data-only address space, the initializing step further comprising the steps of allocating the data-only address space in a memory location of the computer, loading data therein, allocating one or more control blocks in globally accessible memory locations of the computer, storing information in the control blocks that identifies the data-only address space, and establishing an anchor at a fixed location in the globally accessible memory that points to the control blocks;
   (b) executing an application, the executing step further comprising accessing the anchor at the fixed location, determining the globally accessible memory locations of the control blocks, accessing the control blocks at the determined locations, retrieving the information in the control blocks, resolving the information stored in the control blocks into an address for the memory location of the data-only address space,
   wherein the resolving step further comprises:
      (1) invoking a ALESERV macro-instruction to add an STOKEN identifying the dataspace to an access list attached to the application, wherein the ALESERV macro-instruction returns an access list index for the STOKEN,
      (2) switching into an access register (AR) address space control (ASC) mode so that the application can directly address the dataspace, and
      (3) loading the dataspace into an access register so the contents of both a general purpose register and the access register are resolved to a specific location in the dataspace, and accessing the data in the data-only address spaces using the address; and
   (c) repeating the executing step (b) for a plurality of applications.

17. An apparatus for sharing a dataspace stored in a memory of a computer among a plurality of applications executing in the computer, comprising:
   (a) a dataspace services task, executing in the computer, for establishing a dataspace in the memory of the computer;
   (b) one or more control blocks, stored in globally accessible locations in the memory of the computer and anchored by a pointer in a fixed location, for storing information therein identifying the dataspace services task and the dataspace established thereby; and
   (c) an application interface, linked to each of a plurality of applications executing in the computer, comprising means for resolving the information stored in the control blocks into an address for the dataspace,
   wherein the means for resolving further comprises:
      (1) means for invoking a ALESERV macro-instruction to add an STOKEN identifying the dataspace to an access list attached to the application, wherein the ALESERV macro-instruction returns an access list index for the STOKEN,
      (2) means for switching into an access register (AR) address space control (ASC) mode so that the application can directly address the dataspace, and
      (3) means for loading the access list index of the STOKEN identifying the dataspace into an access register so the contents of both a general purpose register and the access register are resolved to a specific location in the dataspace, and means for transferring data between the dataspace and one of the applications.

18. An application interface for a plurality of applications accessing a shared dataspace located in a computer memory, comprising:
   (a) means for attaching the application interface to the applications;
   (b) means for invoking the application interface from one of the applications to access the shared dataspace; and
   (c) means for passing parameters to the application interface to control access to the shared dataspace, the means for passing parameters comprising means for passing:
      (1) a BLOCK parameter containing a binary relative block number that identifies a specific block of data in the dataspace;
      (2) a KEY parameter containing a value that is used during access calls to identify a record within the specific block of data;
      (3) a BUFFER parameter containing an address to a working storage area in the application that is used to move data to or from the dataspace;
      (4) a WORK AREA parameter for storing an address to a working storage area within the DataServ task;
      (5) a CALL CODE parameter containing a value that indicates an initialization, access, and end-of-job access to the dataspace;
      (6) a DSAX NAME parameter containing a left justified, blank padded name of a DataServ Access Exit (DSAX) routine to use during access calls;
      (7) a SYSTEM NAME parameter containing a name for the DataServ task;
      (8) a Dataspace LIST parameter containing a two-byte binary number of the dataspaces owned by the DataServ task followed by a list of left justified, blank padded, 8 byte names for the dataspaces;
      (9) a Dataspace NAME parameter containing a name of a dataspace;
      (10) an APPLICATION ID parameter containing identifier of the application; and
      (11) a USER PARAMETER LIST parameter containing a pointer to an optional parameter list for the DSAX routine.

* * * * *

UNITED STATES PATENT AND TRADEMARK OFFICE
CERTIFICATE OF CORRECTION

PATENT NO. : 5,386,525

DATED : January 31, 1995

INVENTOR(S) : Otto F. Noack

It is certified that error appears in the above-identified patent and that said Letters Patent is hereby corrected as shown below:

In column 2, line 8, please insert --SUMMARY OF THE INVENTION-- after the word "interface."

Signed and Sealed this

Thirtieth Day of May, 1995

Attest:

BRUCE LEHMAN

Attesting Officer     Commissioner of Patents and Trademarks